United States Patent
Ozawa et al.

[11] Patent Number: 5,354,610
[45] Date of Patent: Oct. 11, 1994

[54] MAGNETIC RECORDING MEDIUM COMPRISING A CONDUCTIVE UNDERLAYER CONTAINING CARBON BLACK AND A MAGNETIC LAYER CONTAINING TABULAR BARIUM FERRITE MAGNETIC PARTICLES, α ALUMINA, AND BINDER RESIN

[75] Inventors: Kimio Ozawa; Hisato Kato; Hiromichi Enomoto; Akihiro Maezawa, all of Hino, Japan

[73] Assignee: Konica Corporation, Tokyo, Japan

[21] Appl. No.: 868,719

[22] Filed: Apr. 14, 1992

[30] Foreign Application Priority Data

Apr. 18, 1991 [JP] Japan .................... 3-86894

[51] Int. Cl.$^5$ ............................... G11B 5/00
[52] U.S. Cl. ......................... 428/323; 428/329; 428/694 BS; 428/694 BH; 428/694 BN; 428/900; 428/922
[58] Field of Search .............. 428/323, 328, 329, 331, 428/408, 694, 900, 922, 694 BS, 694 BH, 694 BN

[56] References Cited

U.S. PATENT DOCUMENTS

| | | | |
|---|---|---|---|
| 4,657,814 | 4/1987 | Asai et al. | 428/329 |
| 4,863,793 | 9/1989 | Ogawa et al. | 428/323 |
| 4,916,024 | 4/1990 | Kasuga et al. | 428/323 |
| 4,963,433 | 10/1990 | Ogawa et al. | 428/323 |
| 4,975,322 | 12/1990 | Hideyama et al. | 428/323 |
| 5,047,290 | 9/1991 | Kishimoto et al. | 428/323 |
| 5,079,096 | 1/1992 | Miyake et al. | 428/500 |
| 5,080,967 | 1/1992 | Noguchi et al. | 428/323 |
| 5,149,585 | 9/1992 | Goto et al. | 428/323 |
| 5,151,323 | 9/1992 | Kawahara et al. | 428/323 |

Primary Examiner—Stevan A. Resan
Attorney, Agent, or Firm—Jordan B. Bierman

[57] ABSTRACT

Disclosed is a magnetic recording medium which comprises;
(a) a non-magnetic support; and provided thereon, in sequence
(b) a conductive layer containing carbon black preferably with a DBP absorption of 100 cc/$_{100g}$ or more, an average particle size of 5 to 30 microns and a pH of less than 5; and
(c) a magnetic layer;
(I) containing tabular barium ferrite magnetic particles in each of which the axis of easy magnetization is substantially perpendicular to the plane surface and 7 to 30 parts by weight of alpha alumina; and 0.1 to 5 parts by weight, per 100 parts by weight of said magnetic particles, of carbon black with an average particle size of 40 to 300 mμ; and
(II) is formed on said conductive layer by the wet-on-wet method; a magnetic recording medium according to this invention is improved both in durability and electromagnetic conversion characteristics.

5 Claims, 8 Drawing Sheets

Compounds (1)

Compounds (2)

Compounds (3)

Compounds (4)

Compounds (5)

Compounds (6)

Compounds (7)

Compounds (8)

Compounds (9)

Compounds (10)

Compounds (11)

Compounds (12)

Compounds (13)

Compounds (14)

Compounds (15)

Compounds (16)

Compounds (17)

Compounds (18)

Compounds (19)

Compounds (20)

MAGNETIC RECORDING MEDIUM COMPRISING A CONDUCTIVE UNDERLAYER CONTAINING CARBON BLACK AND A MAGNETIC LAYER CONTAINING TABULAR BARIUM FERRITE MAGNETIC PARTICLES, α ALUMINA, AND BINDER RESIN

FIELD OF THE INVENTION

The present invention relates to a magnetic recording medium, more specifically to a magnetic recording medium improved in durability and electromagnetic conversion characteristics, and therefore, suitable for use as a floppy disc.

BACKGROUND OF THE INVENTION

A magnetic recording medium is generally obtained by applying on a non-magnetic support a magnetic coating composition, followed by drying. A magnetic coating composition is commonly prepared by dispersing uniformly in a binder resin ferromagnetic powder, an abrasive, an anti-static agent, a lubricant, a hardener, other additives, and optionally, a solvent.

It is a common technique to add carbon black to a magnetic layer that contains ferromagnetic metal powder or barium-ferrite tabular particles. By the addition of carbon black, the magnetic layer can have improved abrasion resistance and lower specific surface resistance. Addition of conductive powder (e.g. carbon black, graphite, silver powder, nickel powder) or a surfactant (natural, nonionic, anionic, cationic and ampholytic surfactants) to a magnetic layer to lower its specific surface resistance is known from Japanese Patent Examined Publication Nos. 22726/1971, 24881/1972, 26882/1972, 15440/1973, 26761/1973, U.S. Pat. Nos. 2271623, 2240472, 2288226, 2676112, 2676924, 2676975, 2691566, 2727860, 2730498, 2742379, 2739891, 3068101, 3158484, 3201253, 3210191, 3294540, 3415649, 3441413, 3442654, 3475174 and 3545974.

Addition of conductive powder has such a drawback that the packing density or dispersibility of barium-ferrite powder is lowered due to the presence of conductive powder (in the case of a floppy disc, conductive powder is added normally in an amount larger than that in a magnetic tape), which results in a lowered output and an increased noise level. Surfactants can lower the specific surface resistance of a magnetic layer, but not significantly. Moreover, if a large amount of a surfactant is contained, a magnetic layer inevitably has poor durability. Carbon black contained in a magnetic layer deteriorates the surface condition of the magnetic layer and lowers the packing density of a magnetic substance, and eventually affects adversely the electromagnetic conversion characteristics of a recording medium. In particular, carbon black with an average particle size of 50 mμ or more, which can allow a magnetic layer to have improved abrasion resistance, makes the surface of a magnetic layer excessively rough, thus causing a recording medium to have a lower chroma S/N.

Meanwhile, carbon black with an average particle size of 50 mμ or less and an oil absorption of 100 ml or more is used widely since it can lower the specific surface resistance of a magnetic layer. However, this carbon black cannot be dispersed well in a magnetic layer, and adversely affects the orientation and packing ratio of a magnetic substance, resulting in a lowered chroma output.

Japanese Patent Publication Open to Public Inspection (hereinafter referred to as Japanese Patent O.P.I. Publication) Nos. 125927/1985, 296525/1986, 121927/1987 and 20488/1989 each disclose a recording medium in which a conductive layer containing carbon black is provided between a support and a magnetic layer.

In this recording medium, a conductive layer and a magnetic layer are formed on a support by the wet-on-dry method; i.e., a magnetic layer is formed on a conductive layer after the conductive layer is dried. One drawback of the wet-on-dry method is that a recording medium has poor durability because of poor adhesion between layers. This problem is more serious in a magnetic disc containing barium-ferrite magnetic powder. That is, in the case of a magnetic disc containing barium-ferrite magnetic powder, if layer formation is conducted by the wet-on-dry method, a magnetic layer tends to come off during operation due to its insufficient adhesion to other layers. Another drawback of the wet-on-dry method is that dust is likely to stick to the surface of a recording medium during running, resulting in frequent dropouts. Further, the wet-on-dry method is accompanied by such problem that the roughness of a dried surface of a conductive layer affects adversely the surface condition of a magnetic layer. A solvent contained in a magnetic coating composition is caused to diffuse to a conductive layer, causing a difficulty in smooth casting of the magnetic coating composition on the conductive layer.

Providing on a carbon black-containing subbing layer a 4.0 μm or more-thick magnetic layer that contains ferromagnetic metal powder or barium-ferrite magnetic particles is already known in the art. However, such large thickness of a magnetic layer prevents carbon black from manifesting its effect of lowering the specific surface resistance of a magnetic layer. As a result, dust is likely to stick to a recording medium, causing frequent dropouts. In this technique, a magnetic layer is formed on a subbing layer by the wet-on-dry method which, as mentioned above, has such drawbacks as complicated procedures and deteriorated surface condition of a magnetic layer due to the roughness of a subbing layer. If the surface of a magnetic layer is too rough, a recording medium has a lower chroma S/N.

Under such circumstances, there has been an increasing demand for a magnetic recording medium with a greater memory capacity, a higher reproduction output and more improved durability.

However, none of conventional magnetic recording mediums, in particular, those for use as floppy discs, satisfy such demand.

SUMMARY OF THE INVENTION

The present invention has been made to meet these problems. That is, the object of the invention is to provide a magnetic recording medium which is improved both in durability and electromagnetic conversion characteristics (in particular, output).

The above object can be attained by a magnetic recording medium comprising a non-magnetic support and provided thereon, in sequence, a conductive layer containing carbon black and a magnetic layer containing tabular magnetic particles in each of which the axis of easy magnetization is almost perpendicular to the plane surface and 0.1 to 5 parts by weight, per 100 parts by weight of said magnetic particles, of carbon black with an average particle size of 40 to 300 mμ; said magnetic layer being formed on said conductive layer by the wet-on-wet method. a magnetic recording medium comprising a non-magnetic support and provided thereon, in sequence, a conductive layer containing carbon black and a magnetic layer containing tabular magnetic particles in each of which the axis of easy magnetization is almost perpendicular to the plane surface and 0.1 to 5 parts by weight, per 100 parts by weight of said magnetic particles, of an organic dye compound containing a carboxyl group and/or a sulfonic group; said magnetic layer being formed on said conductive layer by the wet-on-wet method.

In still another aspect of the invention, there is provided a magnetic recording medium comprising a non-magnetic support and provided thereon, in sequence, a conductive layer containing carbon black and a magnetic layer containing tabular magnetic particles in each of which the axis of easy magnetization is almost perpendicular to the plane surface and 0.1 to 5 parts by weight, per 100 parts by weight of said magnetic particles, of a non-magnetic metal oxide with a Mohs hardness of 5 or more; said magnetic layer being formed on said conductive layer by the wet-on-wet method.

DETAILED DESCRIPTION OF THE INVENTION

Figure 1:
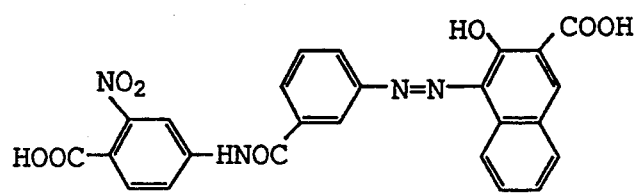
FIG. 1 to 5 are representative examples of the organic dye compounds of the invention.
Figure 1:
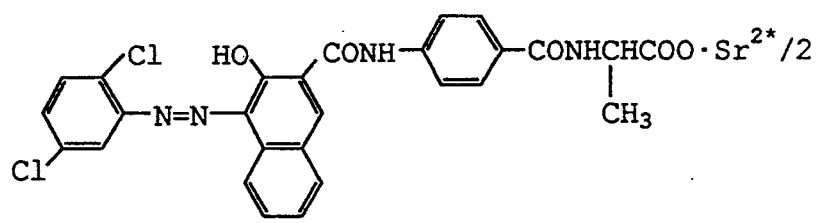
Figure 1:
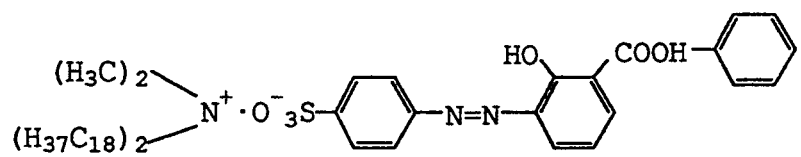
Figure 1:
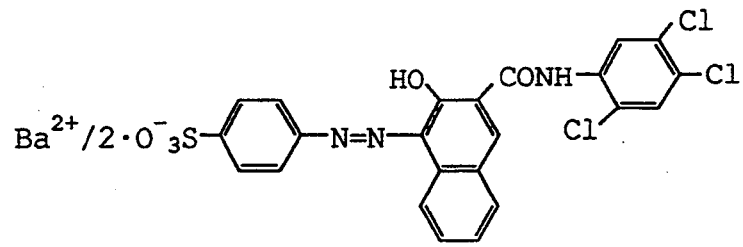

In a magnetic recording medium according to the 1st aspect of the invention, a carbon black-containing conductive layer and a magnetic layer containing a specific amount of specific carbon black and specific magnetic particles are formed in this sequence on a non-magnetic support by the wet-on-wet method.

In a magnetic recording medium according to the 2nd aspect of the invention, a carbon black-containing conductive layer and a magnetic layer containing specific magnetic particles and a specific amount of a specific dye compound are formed in this sequence on a non-magnetic support by the wet-on-wet method.

In a magnetic recording medium according to the 3rd aspect of the invention, a carbon black-containing conductive layer and a magnetic layer containing specific magnetic particles and a specific amount of a specific non-magnetic metal oxide are formed in this sequence on a non-magnetic support by the wet-on-wet method.

Non-Magnetic Support

In a recording medium according to any of above aspects, use can be made of a non-magnetic support made of a polyester such as polyethylene terephthalate and polyethylene-2,6-naphthalate; a polyolefin such as polypropylene; a cellulose derivative such as cellulose triacetate and cellulose diacetate; a plastic such as polyamide and polycarbonate; a metal such as Cu, Al and Zn; and a ceramic such as glass, silicon nitride and Si carbide.

A non-magnetic support may take various forms according to the type of a recorder, but is generally shaped into a film, a sheet, a disc, a card or a drum.

The thickness of a non-magnetic support is 3 to 100 $\mu$m, preferably 5 to 50 $\mu$m, in the case of a support in the form of a film or a sheet, and 30 $\mu$m to 10 mm in the case of a support in the form of a disc or a card.

To improve adhesion between a support and a conductive layer, an intermediate layer or a subbing layer may be provided between a support and a conductive layer.

Conductive Layer In a recording medium according to any of the above aspects, a conductive layer that contains carbon black and a binder is provided on a non-magnetic support.

1. Carbon Black

Usable carbon black include: Conductex 975 (specific surface area: 250 m$^2$/g, particle size: 24 m$\mu$), Conductex 900 (specific surface area: 125 m$^2$/g, particle size: 27 m$\mu$), Conductex 40-220 (particle size: 20 m$\mu$), Conductex SC (particle size: 20 m$\mu$), Raven 1040 and 420 [Conductex and Raven series are manufactured by Colombia Carbon Japan], Vulcan XC-72 (specific surface area: 254 m$^2$/g, particle size: 30 m$\mu$), Vulcan P (particle size: 20 m$\mu$), Black Pearls L 2000 (particle size: 16 m$\mu$) [Vulcan and Black Pearls series are manufactured by Cabot Corp. ], and #44 (manufactured by Mitsubishi Kasei Corp.).

It is desired that carbon black contained in a conductive layer should have a DBP absorption of 100 cc/100 g or more. Such carbon black exhibits a higher conductivity due to the chain-like linking structure of its primary particles.

Representative examples of carbon black with a DBP absorption of 100 cc/100 g or more include: HS-100 (manufactured by Denki Kagaku Kogyo, oil absorption: 187 cc/100 g), BLACK PEARLS 170 (manufactured by Cabot Corp., oil absorption: 122 cc/100 g) , BLACK PEARLS 280 (manufactured by Cabot Corp., oil absorption: 120 cc/100 g), HS-500 (manufactured by Asahi Carbon, oil absorption: 447 cc/100 g), #22B (manufactured by Mitsubishi Kasei Corp., oil absorption: 131 cc/100 g), #20B (manufactured by Mitsubishi Kasei Corp., oil absorption: 115 cc/100 g), R-14 (manufactured by Colombia Carbon, oil absorption: 111 cc/100 g), R-22 (manufactured by Colombia Carbon, oil absorption: 113 cc/100 g) and R-T230 (manufactured by Colombia Carbon, oil absorption: 230 cc/100 g).

The average particle size of carbon black contained in a conductive layer is normally 5 to 30 m$\mu$, preferably 10 to 25 m$\mu$.

In the invention, it is preferred that carbon black contained in a conductive layer have an average particle size of 10 to 25 m$\mu$ and a pH of less than 5.

Specific examples of such carbon black include: MONARCH 1400 (average particle size: 13.0 nm, pH: 2.5), MONARCH 1300 (average particle size: 13.0 nm, pH: 2.5), MONARCH 100 (average particle size: 16.0 nm, pH: 2.5), MOGUL L (BLACK PEARL SL, average particle size: 24.0 nm, pH: 3.0), REGAL 400R (average particle size: 25.0 nm, pH: 3.0) [all manufactured by Cabot Corp.], ROYAL SPECTRA (average particle size: 10.0 nm, pH: 4.0) , NEO SPECTRA MARK I (average particle size: 11.0 nm, pH: 4.0), NEO SPECTRA MARK II (average particle size: 13.0 nm, pH: 3.0), NEO SPECTRA AG (average particle size: 13.0 nm, pH: 3.0), SUPERBA (average particle size: 15.0 nm, pH: 3.2), NEO SPECTRA MARK IV (average particle size: 16.0 nm, pH: 4.5), RAVEN 5000 (average particle size: 12.0 nm, pH: 2.8), RAVEN 7000 (average particle size: 15.0 nm, pH: 2.1), RAVEN 5750 (average particle size: 15.0 nm, pH: 2.1), RAVEN 5250 (average particle size: 20.0 nm, pH: 2.2), RAVEN 3500 (average particle size: 16.0 nm, pH: 2.5), RAVEN 1255 (average particle size: 23.0 nm, pH: 2.5), RAVEN 1040 (average particle size: 28.0 nm, pH: 2.8), RAVEN 1035 (average particle size: 27.0 nm, pH: 3.5) and RAVEN 14 powder (average particle size: 59.0 nm, pH: 3.0) [all manufactured by Colombia Carbon].

The carbon black content of a conductive layer is normally 10 to 400 parts by weight, preferably 100 to 350 parts by weight, per 100 parts by weight of a binder.

2. Binder

Polyurethane resins are most preferable as a binder resin for a conductive layer, since they exhibit good adhesion to other substances, and have improved mechanical strength, e.g., improved resistance to repeated stresses and flexes, and are excellent in abrasion resistance and weatherability. In the present invention, a polyurethane resin can be used in combination with a cellulose-based resin and a vinyl chloride-based resin. Conversely, if a cellulose-based resin and a vinyl chloride-based resin are used as binders, a polyurethane resin must be used together to prevent a conductive layer from getting too hard.

Usable cellulose-based resins include cellulose ethers, cellulose inorganic acid esters and cellulose organic acid esters.

Usable vinyl chloride-based resins include vinyl chloride resins, vinyl acetate-containing copolymers, vinyl chloride-vinyl acetate-vinyl alcohol copolymers, vinyl chloride-vinyl propionate-vinyl alcohol copolymers, vinyl chloride-vinyl acetate-vinyl maleate-vinyl alcohol copolymers and vinyl chloride-vinyl propionate-vinyl maleate-vinyl alcohol copolymers.

The above polyurethane resins and vinyl chloride resins may be partially hydrolyzed.

In the invention, it is desired that each of the above vinyl chloride resins, vinyl chloride-vinyl acetate copolymers and polyurethane resins be modified with an anionic functional group.

Suitable anionic functional groups are $-SO_3M$, $-O-SO_3M$, $-COOM$, $-P(=O)(OM^1)_2$ and $-OP(=O)(OM^1)$ (wherein M represents a hydrogen atom or an alkali metal such as Na, K and Li, and $M^1$ represents a hydrogen atom, an alkali metal such as Na, K, Li or an alkyl group. Two $M^1$s may be either identical or different from each other.

These anionic functional groups can be obtained by subjecting a resin such as a vinyl chloride resin, a polyester resin and a polyurethane resin and a compound that contains in its molecule an anionic functional group and chlorine, such as $Cl-CH_2CH_2SO_3M$, $Cl-CH_2CH_2OSO_3M$, $Cl-CH_2COOM$ and $Cl-CH_2P(=O)(OM^1)^2$ (wherein M and $M^1$ are as defined above), to condensation by dehydrochlorination.

In the invention, it is possible to employ the above-mentioned anionic functional group-modified vinyl chloride resins, polyurethane resins or polyester resins in combination with conventional non-modified vinyl chloride resins, polyurethane resins or polyester resins. Cellulose-based resins or phenoxy resins may also be used in combination. Phenoxy resins are improved in mechanical strength, dimensional stability, resistance to heat, water and chemicals, and adhesiveness. Phenoxy resins, due to these merits, can offset the demerits of polyurethane resins to remarkably improve the time stability of the physical properties of a magnetic recording medium. In the invention, thermoplastic resins, thermosetting resins, reactive resins or electron radiation curing resins may also be contained in a conductive layer in combination with the above-mentioned modified resins.

3. Other Additives

A conductive layer may further contain various additives such as a lubricant. Usable lubricants include fatty acids and fatty acid esters.

Either monobasic or dibasic fatty acids may be employed. Fatty acids with 6 to 30, preferably 12 to 22, carbon atoms are preferable. Examples include caproic acid, caprylic acid, capric acid, lauric acid, isostearic acid, linolenic acid, linoleic acid, oleic acid, elaidic acid, behenic acid, malonic acid, succinic acid, maleic acid, glutaric acid, adipic acid, pimelic acid, azelaic acid, sebacic acid and 1,12-dodecandicarboxylic acid.

Examples of fatty acid esters include oleyl oleate, isocetyl stearate, dioleyl malate, butyl myristate, octyl myristate, octyl palmitate, pentyl stearate, pentyl palminate, isobutyl oleate, stearyl stearate, lauryl oleate, octyl oleate, isobutyl oleate, ethyl oleate, isotridecyl oleate, 2-ethylhexyl stearate, ethyl stearate, 2-ethylhexyl palmitate, isopropyl palmitate, isopropyl myristate, butyl laurate, cetyl-2-ethyl hexalate, dioleyl adipate, diethyl adipate, diisobutyl adipate, diisodecyl adipate, diisodecyl adipate, oleyl stearate, 2-ethylhexyl myristate, isopentyl palmitate, isopentyl stearate, diethylene glycol monobutyl ether palmitate and diethyleneglycol monobutyl ether palminate.

These lubricants may be employed either alone or in combination, and may be either identical with or different from lubricants contained in a magnetic layer.

The lubricants are contained in a conductive layer in an amount of 0.2 to 20 parts by weight per 100 parts by weight of a binder.

If the thickness of a magnetic layer is small, the apparent amount of a lubricant contained therein is reduced, resulting in decreased durability. If a large amount of a lubricant is contained in a magnetic layer, there may occur such troubles as oozing out of the lubricant and lowered output. That is, there may be cases where a magnetic layer cannot contain a lubricant in an amount sufficient enough to obtain high durability. Addition of a lubricant to a conductive layer is important to avoid this problem. A lubricant contained in a conductive layer exerts its lubricating effect also to a magnetic layer, thus improving the durability of a magnetic layer.

Other ingredients may be added to a conductive layer. For instance, inorganic fillers may be added to a conductive layer. Examples include magnetic powder such as $\gamma\text{-}Fe_2O_3$, $Co\text{-}\gamma\text{-}Fe_2O_3$, a metal and barium-ferrite, an abrasive such as SiC, $\alpha\text{-}Al_2O_3$, $\alpha\text{-}Fe_2O_3$ and $Cr_2O_3$ and carbon black with a small BET value.

The dry thickness of a conductive layer is normally 0.1 to 3.0 μm, preferably 0.3 to 2.0 μm, most preferably 0.5 to 1.5μm.

Magnetic Layer (1)

The magnetic layer of a recording medium according to the 1st aspect of the invention contains a binder, specific magnetic particles, and a specific amount of carbon black of specific size.

1. Magnetic Particles

One of the essential features of the present invention is that magnetic particles contained in a magnetic layer are tabular, in each of which the axis of easy magnetization is almost perpendicular to the plane surface.

Examples of such magnetic particles include hexagonal system ferrite which consists of barium ferrite, strontium ferrite or the like. Some of Fe elements in the hexagonal system ferrite may be replaced by other elements such as Ti, Co, Zn, In, Mn, Ge and Hb. Details of hexagonal ferrite are described in IEEE Trans. on MAG-18 16 (1982).

In the invention, it is preferred that the magnetic powder contained in a magnetic layer be barium-ferrite powder (hereinafter abbreviated as Ba-Fe powder). In particular, Ba-Fe powder with an average particle size of 400 to 900 Å (the particle size is defined as the length of a diagonal line of the plane surface), an aspect ratio of 2.0 to 10.0 (the aspect ratio is defined as the ratio of the length of a diagonal line of the plane surface to the thickness of the particle) and a coercive force of 450 to 1,500 Oe, in which at least some of Fe elements are replaced by Co and Zn.

By the partial replacement of Fe elements by Co, the coercive force of Ba-Fe powder can be adjusted to an adequate value. Replacement of some Fe elements by Zn causes considerably high saturation magnetization, resulting in remarkably improved electromagnetic conversion characteristics, in particular, reproduction output. When some Fe elements are replaced by Hb, the electromagnetic conversion characteristics, in particular, reproduction output, can be further improved. In the invention, some of Fe elements may be further replaced by transition metals such as Ti, In, Mn, Cu, Ge and Sn. Ba-Fe to be employed in the invention can be represented by the following formula:

$$BaO \cdot n[(Fe_{1-m}M_m)_2O_3]$$

(wherein M is a substituting metal; $m > 0.36$; and n is 5.4 to 6.0, provided that $Co + Zn = 0.08$ to 0.3, $Co/Zn = 0.5$ to 10). It is preferred that M be a combination of two or more different kinds of metals (the average number of M is 3).

When the average particle size of Ba-Fe powder is less than 400 Å, the reproduction output of a recording medium will be lowered. An average particle size exceeding 900 Å makes the surface of a magnetic layer excessively rough, resulting in a higher noise level. When the aspect ratio is less than 2, it is impossible to obtain a perpendicular orientation ratio which is suited to high density recording. If the aspect ratio exceeds 10.0, the surface smoothness of a magnetic layer will be deteriorated considerably, resulting in a higher noise level. A coercive force below 450 Oe makes it difficult to keep recording signals. When the coercive force exceeds 1,500 Oe, a magnetic headuLs saturation flux does not cause sufficient magnetic inversion, resulting in difficulty in recording.

Ba-Fe powder to be employed in the invention can be prepared by, for instance, the glass crystalization method comprising: melting oxidized and carbonized products of raw material elements with a glass-forming substance such as boric acid; quenching the resultant to obtain glass; subjecting the glass at a prescribed temperature to allow Ba-Fe crystal powder to be deposited; and removing the glass components by heat treatment. Also applicable are the co-precipitation-calcination method, the hydrothermal synthesis method, the flux method, the alkoxide method and the plasma jet method.

In the invention, in combination with the "tabular magnetic particles in each of which the axis of easy magnetization is almost perpendicular to the plane surface", a magnetic layer may also contain conventional magnetic substances in such an amount as will not adversely affect the effects of the invention. Examples include magnetic oxides such as $\gamma$-$Fe_2O_3$, Co-$\gamma$-$Fe_2O_3$ (e.g. Co-containing $\gamma$-$Fe_2O_3$, Co-adsorbed $\gamma$-$Fe_2O_3$), $Fe_3O_4$, Co-$\gamma$-$Fe_3O_4$ (e.g. Co-containing $\gamma$-$Fe_3O_4$, Co-adsorbed $\gamma$-$Fe_3O_4$) and $CrO_2$, as well as metallic magnetic powder composed mainly of Fe, Ni and Co, e.g., Fe, Ni, Fe-Ni alloys, Fe-Co alloys, Fe-Ni-P alloys, Fe-Ni-Co alloys, Fe-Mn-Zn alloys, Fe-Ni-Zn alloys, Fe-Co-Ni-Cr alloys, Fe-Co-Ni-P alloys, Co-P alloys and Co-Cr alloys. These metallic magnetic substances may contain Si, Cu, Zn, Al, P, Mn, Cr and other elements or their compounds.

2. Binder

In a magnetic layer of the magnetic recording medium according to the 1st aspect of the invention, the same binder as that employed for a conductive layer is contained.

In a magnetic layer, the amount of a binder accounts for 5 to 30 wt % of the amount of ferromagnetic powder.

A magnetic layer, in which ferromagnetic powder is fixed by a binder resin, may further contain various additives to improve the durability of a recording medium.

In the invention, by the addition of a specific amount of carbon black with a specific particle size to a magnetic layer, the durability and running stability of a magnetic recording medium will be remarkably improved.

3. Carbon Black

In the 1st aspect of the present invention, it is essential that a magnetic layer contain 0.1 to 5 parts by weight, per 100 parts by weight of the aforementioned specific magnetic particles, of carbon black with an average particle size of 40 to 300 m$\mu$.

Examples of carbon black with an average particle size of 40 to 300 m$\mu$ include R-14 (specific surface area: 45 m$^2$/g, average particle size: 68 m$\mu$), R-420 (specific surface area: 25 m$^2$/g, average particle size: 68 m$\mu$), R-450 (specific surface area: 33 m$^2$/g, average particle size: 62 m$\mu$), R-MT-P (specific surface area: 8 m$^2$/g, average particle size: 280 m$\mu$)[all manufactured by Colombia Carbon Japan], BLACK PEARLS 170 (specific surface area: 35 m$^2$/g, average particle size: 50 m$\mu$ ), BLACK PEARLS 130 (specific surface area: 25 m$^2$/g, average particle size: 75 m$\mu$), BLACK PEARLS 280 (specific surface area 42 m$^2$/g, average particle size: 41 m$\mu$) [all manufactured by Cabot Corp.], #22B (specific surface area: 55 m$^2$/g, average particle size: 40 m$\mu$), #20B (specific surface area: 56 m$^2$/g, average particle size: 40 m$\mu$), CF-9 (specific surface area: 60 m$^2$/g, average particle size: 40 m$\mu$), #3500 (specific surface area: 47 m$^2$/g, average particle size: 40 m$\mu$) [all manufactured by Mitsubishi Kasei Corp.], HS-100 (specific surface area: 32 m$^2$/g, average particle size: 53 m$\mu$) [manufactured by Denka] and HS-500 (specific surface area: 37 m$^2$/g, average particle size: 76 m$\mu$) [manufactured by Asahi Carbon].

When the average particle size of carbon black is less than 40 m$\mu$, there may occur such troubles as insufficient dispersion of carbon black and increased friction on the surface of a magnetic layer. If the average particle size exceeds 300 m$\mu$, carbon black affects adversely the surface condition of a magnetic layer, resulting in deteriorated electromagnetic conversion characteristics.

The amount of carbon black is preferably 0.1 to 5.0 parts by weight, still preferably 0.3 to 2.0 parts by weight, per 100 parts by weight of the above-mentioned magnetic powder. If the amount of carbon black is too small, its effects cannot be manifested sufficiently, and an excessive amount of carbon black results in deteriorated electromagnetic conversion characteristics.

In the invention, it is preferable to use carbon black with a DBP absorption exceeding 100 cc/100 g.

Examples of such carbon black include HS-100 manufactured by Denka (oil absorption: 187 cc/100 g), BLACK PEARLS 170 (oil absorption: 122 cc/100 g ), BLACK PEARLS 280 (oil absorption: 120 cc/100 g) [manufactured by Cabot Corp.], HS-500 (oil absorption: 447 cc/100 g) [manufactured by Asahi Carbon], #22B (oil absorption: 121 cc/100 g), #20B (oil absorption: 115 cc/100 g) [manufactured by Mitsubishi Kasei Corp.], R-14 (oil absorption: 111 cc/100 g) , R-22 (oil absorption: 113 cc/100 g) and R-T230 (oil absorption: 230 cc/100 g) [manufactured by Colombia Carbon].

4. Other Additives

A magnetic layer may contain the same lubricant as that contained in a conductive layer.

The amount of a lubricant is 0.2 to 50 parts by weight per 100 parts by weight of a binder resin.

To improve the durability of a magnetic layer, it is possible to add various hardeners to a magnetic coating composition.

Usable hardeners are isocyanates such as aromatic isocyanates and aliphatic isocyanates.

Examples of usable aromatic isocyanates include tolylene diisocyanate (TDI) and active hydrogen compound adducts of these isocyanates, with preference given to those with a molecular weight of 100 to 3,000.

Examples of usable aliphatic isocyanates include hexamethylene diisocyanate (HMDI) and active hydrogen compound adducts of these isocyanates, with preference given to those with a molecular weight of 100 to 3,000. Among the aliphatic isocynates, non-alicyclic isocyanates and active hydrogen adducts of these compounds are preferable.

A magnetic coating composition to be employed to form a magnetic layer may contain dispersants and other additives such as abrasives and anti-static agents.

Examples of dispersants include phosphates, amine compounds, alkyl sulfates, fatty acid amides, higher alcohols, polyethylene oxide, sulfosuccinic acid, sulfosuccinates, known surfactants and their salts. Also usable are salts of polymer dispersants with an anionic organic group (e.g. —COOH). These dispersants may be used alone or in combination.

Examples of dispersants include C12–22 fatty acids such as caprylic acid, capric acid, lauric acid, myristic acid, palmitic acid, stearic acid and oleic acid, alkali metal salts, alkaline metal salts or amides of these acids; polyalkylene oxide alkylphosphates; lecithin; trialkylpolyolefinoxy quaternary ammonium acid; and azo compounds containing carboxyl and sulfonic groups. The amount of these dispersants accounts for 0.5 to 5 wt % of the amount of ferromagnetic powder. Dispersants may be employed either alone or in combination.

Non-magnetic abrasive may be contained in a magnetic layer. Examples include alumina ($\alpha$-$Al_2O_3$, $\beta$-$Al_2O_3$, $\gamma$-$Al_2O_3$, $\delta$-$Al_2O_3$, $\zeta$-$Al_2O_3$, $\eta$-$Al_2O_3$, $\theta$-$Al_2O_3$, $\kappa$-$Al_2O_3$, $\chi$-$Al_2O_3$ and $\pi$-$Al_2O_3$), alumina hydrates, silicates such as alumina silicates, carbides such as silicon carbide and boron carbide, non-magnetic oxides such as chromium oxides and iron oxides and nitrides such as boron nitrides. The abrasive has an average particle size of preferably 0.05 to 5 $\mu$m, still preferably 0.1 to 2 $\mu$m, and is employed in an amount of 1 to 20 parts by weight per 100 parts by weight of a binder.

There is no need to add a conventional anti-static agent to a magnetic layer. This is because a conductive layer provided between a magnetic layer and a non-magnetic support can lower the specific surface electrical resistance of the magnetic layer sufficiently. Such elimination of anti-static agents contributes to increased packing density or dispersibility of Ba-Fe powder.

The dry thickness of a magnetic layer is 0.3 to 2.5 $\mu$m, preferably 0.5 to 1.5 $\mu$m.

When the dry thickness of a magnetic layer exceeds 2.5 $\mu$m, the surface specific resistance of the magnetic layer increases, resulting in frequent dropouts. If the dry thickness of a magnetic layer is smaller than 0.3 $\mu$m, non-magnetic layers adversely affect the surface condition of the magnetic layer, causing lumi S/N and chroma S/N to be lowered.

Magnetic Layer (2)

According to the 2nd aspect of the invention, a magnetic layer contains a binder, specific magnetic particles and a specific amount of an organic dye compound.

1. Magnetic Particles

The same magnetic particles as those contained in a recording medium according to the 1st aspect of the invention.

2. Binder

The same binder as that contained in a recording medium according to the 1st aspect of the invention.

3. Other Additives

The same additives as those contained in a recording medium according to the 1st aspect of the invention.

4. Dye Compound

According to the 2nd aspect of the invention, a magnetic layer is required to contain 0.5 to 5 parts by weight, per 100 parts by weight of tabular magnetic particles in each of which the axis of easy magnetization is almost perpendicular to the plane surface, of organic dye compounds containing a carboxyl group and/or a sulfonic group.

By containing such organic dye compound, a magnetic recording medium can have higher durability.

When the organic dye compound content is less than 0.5 parts by weight, a magnetic recording medium has poor durability. If the amount of an organic dye compound exceeds 5 parts by weight, a magnetic layer is plasticized excessively.

In the invention, it is preferable to employ a red, azo-based compound that contains a carboxyl group and/or a sulfonic group in the form of a salt, and has a molecular weight of 3,000 or less. Specifically, it is preferable to use an organic dye compound represented by the following formula:

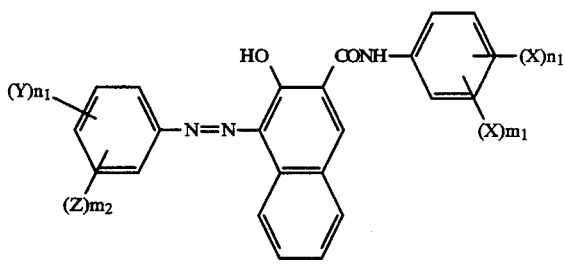

(wherein $n_1$ and $n_2$, whether identical or different, each represent an integer of 0 to 5; $m_1$ and $m_2$, whether identical or different, each represent an integer of 0 to 2; X represents Cl, $NO_2$, $CH_3$, $C_2H_5$ or $OCH_3$; Y represents Cl; and Z represents a carboxyl group or a sulfonic group which may be in the form of a salt)Preferred salts of the carboxyl group or the sulfonic group are ammonium salts, alkali metal salts, alkaline earth metal salts and organic amine salts.

Figure 2:
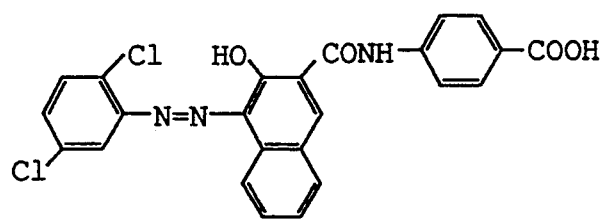
Figure 2:
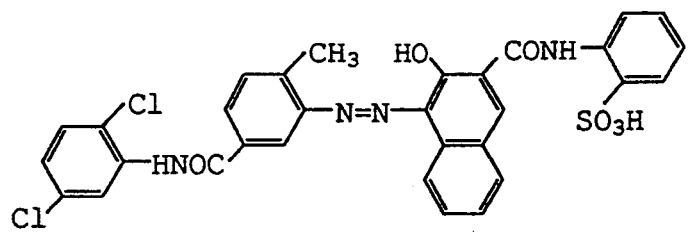
Figure 2:
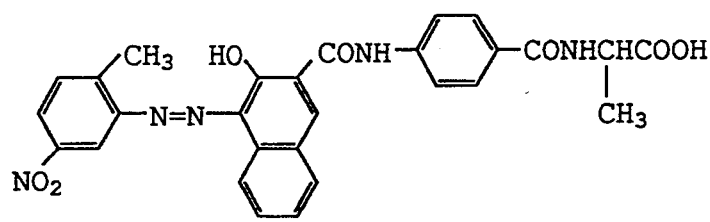
Figure 2:
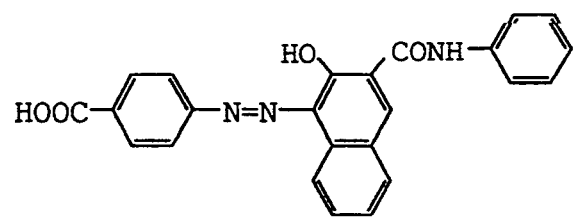
Figure 3:
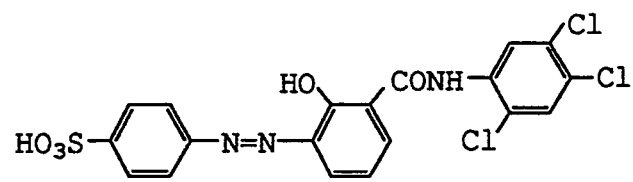
Figure 3:
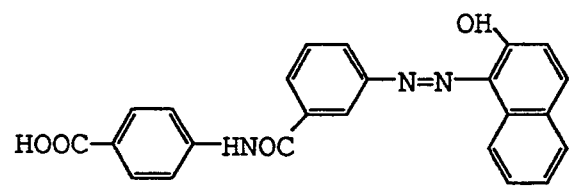
Figure 3:
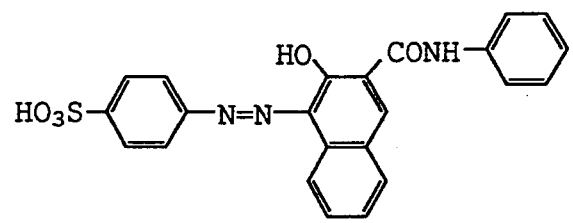
Figure 3:
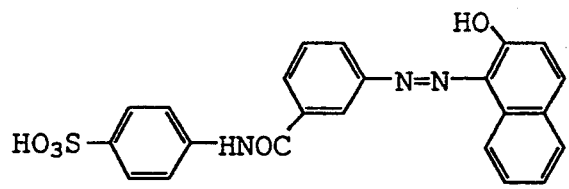
Figure 4:
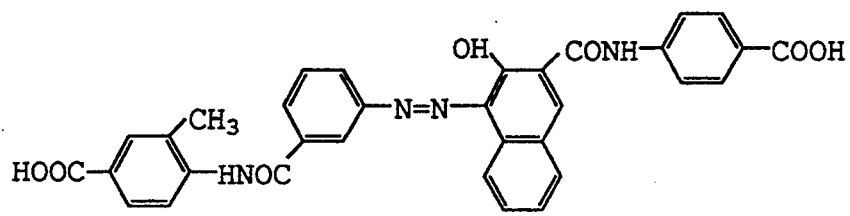
Figure 4:
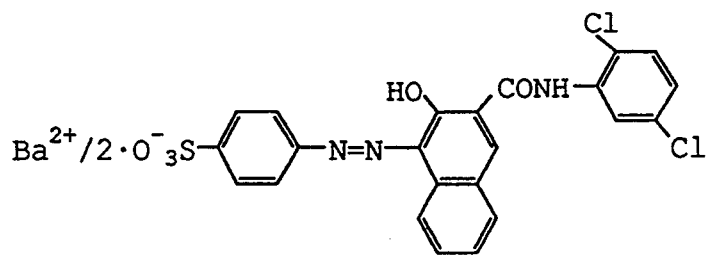
Figure 4:
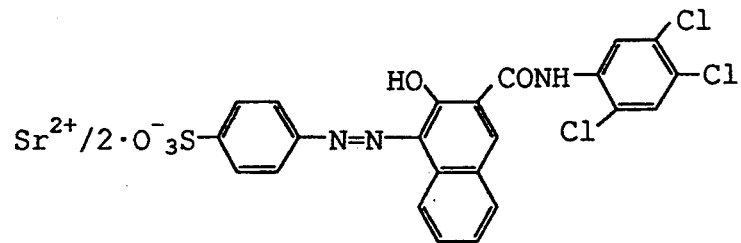
Figure 4:
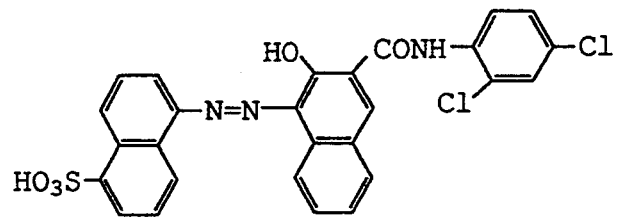
Figure 5:
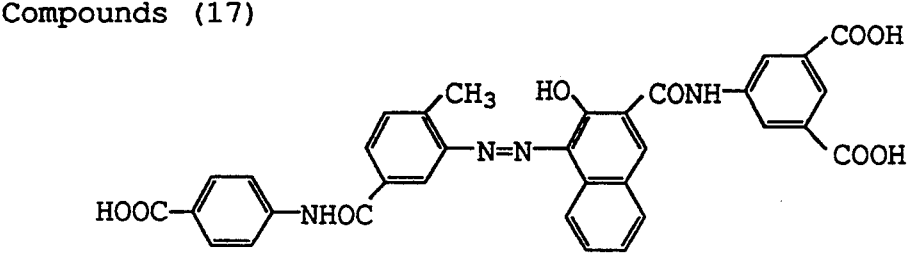
Figure 5:
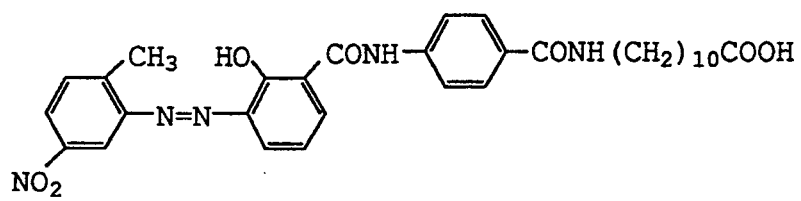
Figure 5:
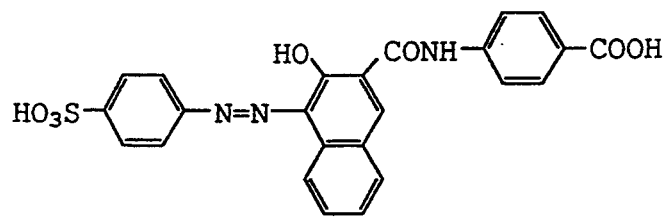
Figure 5:
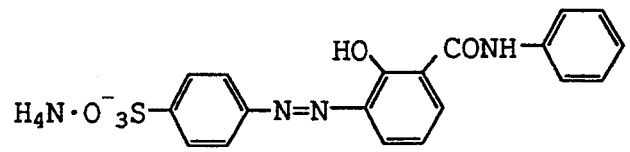

Representative examples of the organic dye compounds represented by the above formula are given in FIGS. 1 to 5 [compounds (1) to (4) in FIG. 1, compounds (5) to (8) in FIG. 2, compounds (9) to (12) in FIG. 3, compounds (13) to (16) in FIG. 4 and compounds (17) to (20) in FIG. 5].

The thickness of a magnetic layer of a recording medium according to the 2nd aspect of the invention is identical with that of a magnetic layer of a recording medium according to the 1st aspect of the invention.

Magnetic Layer (3)

A magnetic layer of a magnetic recording medium according to the 3rd aspect of the invention contains a binder resin, specific magnetic particles and a specific amount of a specific non-magnetic metal oxide.

1. Magnetic Particles

The same magnetic particles as those contained in a magnetic layer of a magnetic recording medium according to the 1st aspect of the invention.

2. Binder

The same binder as that contained in a magnetic layer of a magnetic recording medium according to the 1st aspect of the invention.

3. Other Additives

The same additives as those contained in a magnetic layer of a magnetic recording medium according to the 1st aspect of the invention.

4. Non-Magnetic Metal Oxide

According to the 3rd aspect of the invention, it is essential that a magnetic layer contain 7 to 30 parts by weight, preferably 10 to 20 parts by weight, per 100 parts by weight of the above-mentioned specific magnetic particles, i.e., tabular magnetic particles in each of which the axis of easy magnetization is almost perpendicular to the plane surface, of a non-magnetic metal oxide with a Mohs hardness of 5 or more.

By the addition of such non-magnetic metal oxide, it is possible to obtain a magnetic recording medium improved in output and durability.

A non-magnetic metal oxide with a Mohs hardness of less than 5 cannot manifest the so-called abrasion effect by which a magnetic head can be cleaned. If employed in an amount less than 7 parts by weight, a non-magnetic metal oxide cannot exhibit its effect of improving the strength of a magnetic layer. An amount exceeding 30 parts by weight results in excessive abrasion of a magnetic head.

Examples of non-magnetic metal oxides having a Mohs hardness of 5 or more include G-alumina, $Cr_2O_3$, $\alpha$-$Fe_2O_3$, silica, $TiO_2$, zirconia, silicon carbide and silicon nitride. These metal oxides may be employed either alone or in combination. Non-magnetic metal oxide normally has an average particle size of 0.2 to 0.8 $\mu$m, preferably 0.3 to 0.6 $\mu$m.

Non-magnetic metal oxides may be employed either singly or in combination. When two or more kinds of metal oxides are used in combination, they may be either identical with or different from each other in average particle size. For instance, a mixture of 70% by weight of a non-magnetic metal oxide with an average particle size of 0.3 $\mu$m and 30% by weight of a non-magnetic metal oxide with an average particle size of 0.7 $\mu$m can be used.

The thickness of a magnetic layer of a magnetic recording medium according to the 3rd aspect of the invention is identical with that of a magnetic layer of a magnetic recording medium according to the 1st aspect of the invention.

Preparation of Magnetic Recording Medium

Two methods are available for forming a conductive layer and a magnetic layer on a support; the wet-on-dry method in which coating and drying are repeated for each layer, and the wet-on-wet method in which wet layers are provided on a support either simultaneously or in sequence. In the present invention, however, a conductive layer and a magnetic layer must be provided on a support by the wet-on-wet method. By using this coating method, the effects of the invention can be manifested successfully.

Figure 6:
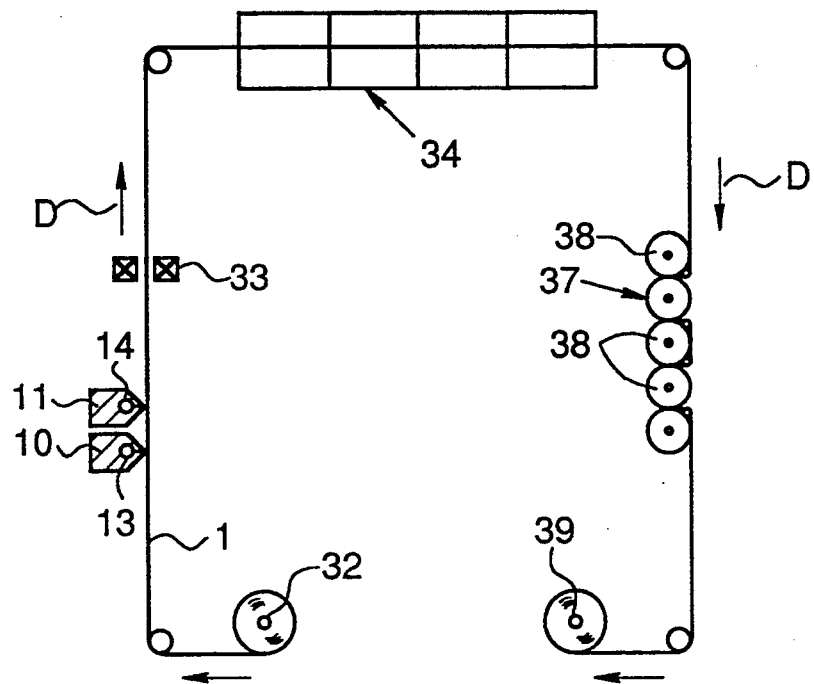
FIG. 6 shows a process for preparing a magnetic recording medium by the wet-on-wet method.

One preferred method of preparing a magnetic recording medium of the invention will be described below by referring to FIG. 6.

On a film-shaped support 1 that has been fed from a feed roll 32 in direction D, coating compositions for a conductive layer and a magnetic layer are applied by the wet-on-wet method by means of extrusion coaters 10 and 11. After passing through a magnet 33 for non-orientation or perpendicular orientation, the support 1 is introduced into a dryer 34 where drying is performed with hot air blown from upper and lower nozzles. The support 1 is then introduced into a super calendaring apparatus 37 which consists of a plurality of calendaring rolls 38, where the support is subjected to calendaring treatment. After calendaring, the support 1 is wound around a wind-up roll 39. In the same manner as mentioned above, a conductive layer and a magnetic layer are provided on the other side of the support. The so-obtained magnetic film is punched into a desired shape, such as a circular disc, and housed in a cartridge to obtain a 3.5 inch-floppy disc.

In the above method, each coating composition may be supplied to the extrusion coaters 10 and 11 through an in-line mixer (not shown). Each of the extrusion coaters is provided with a well (13, 14) to permit wet-on-wet application of the coating compositions, in which, immediately after the application of a coating composition for a conductive layer (that is, when the coating film is still wet), a coating composition for a magnetic layer is applied.

Figure 7:
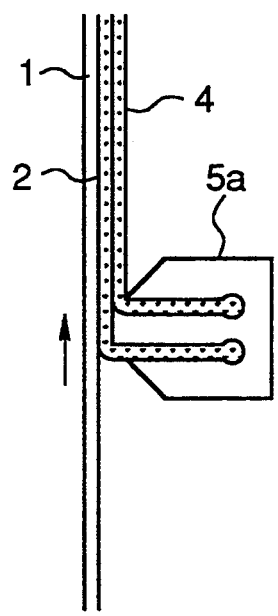
FIGS. 7 and 8 are representative of extrusion coaters which may be used in the wet-on-wet coating method.
Figure 8:
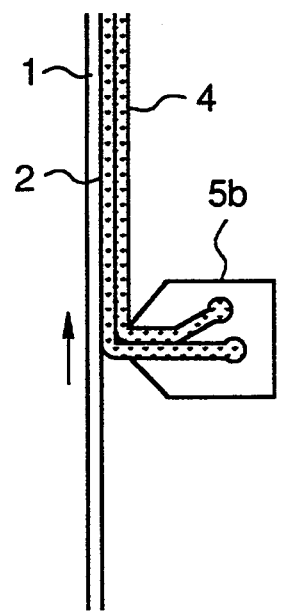

In addition to the above-mentioned two extrusion coaters 10 and 11, it is possible to employ an extrusion coater 5a as shown in FIG. 7 and an extrusion coaster 5b as shown in FIG. 8, each having paths of coating compositions for a conductive layer 2 and a magnetic layer 4. Extrusion coaters may be employed in combination with a reverse roll, a gravure roll, an air doctor coater, a blade coater, an air knife coater, a squeeze coater, an impregnation coater, a transfer roll coater, a kiss coater, a cast coater or a spray coater.

In the wet-on-wet coating method, since a magnetic layer is formed on an undried conductive layer, not only the surface of the conductive layer (i.e., the boundary between the magnetic layer and the conductive layer) but also the surface of the magnetic layer becomes smooth, and at the same time, adhesion between layers is improved. Due to these merits, the wet-on-wet coating method can provide a recording medium capable of performing high density recording with a higher output and a lower noise level, and therefore, suitable for use as a magnetic disc. Further, the wet-on-wet coating method can provide a recording medium with improved durability, since films formed by this method are tough and hardly come off. Durability is a matter of greater account in magnetic discs than in magnetic tapes. The wet-on-wet method can provide a recording medium which is free from dropouts, and therefore, has improved reliability.

A magnetic layer and a conductive layer formed by the wet-on-wet method usually share a common clear boundary. There may also be a case where, between these two layers, a boundary area with a uniform thickness is present. In such area, conductive layer components and magnetic layer components are present in a mixed state. A recording medium with such boundary area also falls within the scope of the invention.

As solvents to be contained in each coating composition or to be employed for diluting each coating composition, use can be made of ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and ethylene glycol monoacetate; ethers such as glycol dimethyl ether, glycol monoethyl ether, dioxane and tetrahydrofuran; aromatic hydrocarbons such as benzene, toluene and xylene; and halogenated hydrocarbons such as methylene chloride, ethylene chloride, carbon tetrachloride, chloroform and dichlorobenzene. These solvents may be used either alone or in combination.

In preparing a recording medium according to the 3rd aspect of the invention, it is advisable that a non-magnetic metal oxide and ferromagnetic powder be dispersed separately so that two different slurry-like dispersions can be formed, which will be mixed later. As compared with simultaneous mixing of a metal oxide, ferromagnetic powder and other ingredients, such separate dispersion of a metal oxide and ferromagnetic powder makes a greater contribution to the improvement of the durability of a recording medium.

Dispersion of a non-magnetic metal oxide can be performed by using a solvent, a binder or the like. As the binder, resins such as a polyurethane resin and a polyester resin are usable. In the invention, it is preferred that these resins be modified with a sulfonic group, a carboxyl group, a phosphoric group or a salt of these groups.

The magnetic field generated by the above-mentioned magnet for non-orientation or perpendicular orientation has an intensity of 20 to 5,000 Gauss on an AC or DC basis. Drying is performed at 30° to 120° C. for 0.1 to 10 minutes.

As described hereinabove, a recording medium of the invention comprises a non-magnetic support and provided thereon a conductive layer that contains carbon black and a magnetic layer that contains ferromagnetic Ba-Fe powder. This recording medium is distinguished from conventional recording mediums due to its greater recording capacity and higher reproduction output. In the invention, a magnetic layer further contains a specific amount of carbon black with a specific particle size, whereby the friction on the magnetic layer can be minimized to allow a recording medium to have improved running stability and durability.

A recording medium of the invention is suitable for use as a floppy disc, in particular, as a 3.5-inch double-sided magnetic disc.

EXAMPLES

The present invention will be described in more detail according to the following examples. The ingredients, the amounts of the ingredients and the procedures described hereinafter may be altered as long as the spirit of the invention will not be distorted by such alteration. In the following, parts are parts by weight unless otherwise indicated.

Examples 1 to 13

The following ingredients were kneaded sufficiently by means of a kneader and a ball mill to form a coating composition for a magnetic layer (coating composition I) and a coating composition for a conductive layer (coating composition II). Immediately before application, 5 parts by weight of a polyisocyanate compound (Coronate L manufactured by Nippon Polyurethane Industry Co., Ltd.) was added to each composition.

EXAMPLES 1', 14'

Samples were prepared in the same manner as in Examples 1 and 14 except that UR-8300 ($SO_3M$-containing polyurethane resin, manufactured by TOYOBO) was used in place of polyurethane resin, Nippolan 2304 and MR110 ($SO_3M$-containing vinyl chloride, manufactured by NIHON ZEON) was used in place of vinyl chloride-vinyl acetate-vinyl alcohol copolymer both in coating composition I and IV.

Coating composition I for a magnetic layer

| | |
|---|---|
| Ba—Fe magnetic powder (BET specific surface area: 32 $m^2/g$, Hc: 600 Oe) | 100 parts |
| Polyurethane resin (Nippolan 2304 manufactured by Nippon Polyurethane Industry Co., Ltd.) | 6 parts |
| Vinyl chloride-vinyl acetate-vinyl alcohol copolymer (VAGH manufactured by U.C.C.) | 8 parts |
| α-alumina | 7 parts |
| Carbon black (Trade name and particle size: shown in Table 1) | Amount shown in Table 1 |
| Oleyl oleate | 5 parts |
| Cyclohexanone | 200 parts |
| Toluene | 30 parts |
| Methyl ethyl ketone | 30 parts |

Coating composition II for conductive layer

| | |
|---|---|
| Carbon black [Conductex SC (C-SC) manufactured by Colombia Carbon Japan] | 100 parts |

-continued

| | |
|---|---|
| Polyurethane resin (Nippolan 2304 manufactured by Nippon Polyurethane Industry Co., Ltd.) | 40 parts |
| Vinyl chloride-vinyl acetate-vinyl alcohol copolymer (VAGH manufactured by U.C.C.) | 60 parts |
| Cyclohexanone | 600 parts |
| Toluene | 200 parts |
| Methyl ethyl ketone | 200 parts |

On a 75 μm-thick polyethylene terephthalate base film, the above coating compositions II and I were applied in this sequence by the wet-on-wet method by means of an extrusion coater. After drying, the film was subjected to calendaring treatment. The coating compositions were applied onto the other side of the film in the same manner, followed by drying and calendaring treatment. The dry thickness of each layer is shown in Table 1.

The so-obtained magnetic film was punched into a circular disc with a diameter of 86 mm, and housed in a cartridge to obtain a 3.5 inch-floppy disc. The floppy disc was examined for the following properties, and the results are shown in Table 1.

(1) Reproduction Output

Using the following drive, 2F sinusoidal signals (500 KHz) were recorded. The signals were then reproduced to measure a reproduction output.

Drive: PD-211 manufactured by Toshiba Corp.
Number of tracks: 79

Reproduction output was indicated as a value relative to that of a floppy disc prepared in Comparative Example 4, which was taken as 100%. Larger reproduction outputs are favorable.

(2) Durability

The floppy disc sample was put in a reproduction apparatus, and a magnetic head was brought in contact with the disc by a 4 MB drive (PD-211 manufactured by Toshiba Corp.) at an insertion pressure of 50 g/cm$^2$. The disc was then rotated at a speed of 100 rpm, while changing temperature and humidity. Durability was evaluated in terms of the time required for reducing a reproduction output by 30% from the initial value.

(3) Specific Surface Resistance

The floppy disc sample was placed between two 10 mm-wise electrodes (the distance between the electrodes: 10 mm). An electrical voltage of 100 V was applied to measure the specific surface resistance. In the table, larger values mean larger specific surface resistances.

(4) Dynamic Coefficient of Friction

Dynamic coefficient of friction was measured immediately after the start of running and after 24 hour-continuous running using MFD-1000/2000 (a crockmeter manufactured by Yokohama System Laboratory).

Conditions: Magnetic head insertion pressure: 20 g
Disc rotation speed: 300 rpm
Number of tracks: 79
Temperature & humidity: normal Comparative Example 1

A 3.5-inch floppy disc was prepared in substantially the same manner as in Example 1, except that the coating was conducted by the wet-on-dry method. The properties of the disc were examined by the same method as mentioned above, and the results are shown in Table 1.

Comparative Example 2

The coating composition I was applied on a 75 μm-thick polyethylene terephthalate base film, followed by drying and calendaring, whereby a 3.5-inch floppy disc having a dry thickness of 1.2 μm and having only a single magnetic layer was obtained. The properties of the disc were examined by the same method as mentioned above, and the results are shown in Table 1.

Comparative Example 3

Coating composition III was prepared in substantially the same manner as in the preparation of the composition I, except that 7 parts by weight of carbon black (C-975 manufactured by Colombia Carbon Japan) was added. This composition was applied on a 75 μm-thick polyethylene terephthalate base film, followed by drying and calendaring, whereby a 3.5-inch floppy disc was obtained. The properties of the disc were examined by the same method as mentioned above, and the results are shown in Table 1.

Comparative Example 4

A 3.5-inch floppy disc was prepared in substantially the same manner as in Example 1, except that the use of 0.3 part by weight of carbon black R-14 was omitted. The properties of the disc were examined by the same method as mentioned above, and the results are shown in Table 1.

Comparative Example 5

A 3.5-inch floppy disc was prepared in substantially the same manner as in Example 1, except that the amount of carbon black (R-14) was varied to 5.5 parts. The properties of the disc were examined by the same method as mentioned above, and the results are shown in Table 1.

Comparative Examples 6 and 7

A floppy disc was prepared in substantially the same manner as in Example 1, except that the particle size and amount of carbon black in the coating composition I and the particle size and amount of carbon black in the coating composition II were varied to those shown in Table 1. The properties of the discs were examined by the same method as mentioned above, and the results are shown in Table 1.

TABLE 1

| Example/Comparative example, (coating method) | Carbon black in magnetic layer | | Dry thickness (μm) | | Reproduction output (%) | Durability (Hr) 0 to 60° C., 24 hr cycle | Dynamic coefficient of friction | | Specific surface resistance |
|---|---|---|---|---|---|---|---|---|---|
| | Trade name (average particle size) | Amount (parts by weight) | Conductive layer | Magnetic layer | | | Immediately after the start | 24 hours after the start | |
| Example 1 (w/w) | R-14 (68 nm) | 0.3 | 1.0 | 1.2 | 100 | 800 or more | 0.20 | 0.24 | $3.1 \times 10^7$ |
| Example 2 (w/w) | R-14 (68 nm) | 1.0 | 1.0 | 1.2 | 98 | 800 or more | 0.18 | 0.19 | $3.1 \times 10^7$ |

TABLE 1-continued

| Example/Comparative example, (coating method) | Carbon black in magnetic layer | | Dry thickness (μm) | | Reproduction output (%) | Durability (Hr) 0 to 60° C., 24 hr cycle | Dynamic coefficient of friction | | Specific surface resistance |
|---|---|---|---|---|---|---|---|---|---|
| | Trade name (average particle size) | Amount (parts by weight) | Conductive layer | Magnetic layer | | | Immediately after the start | 24 hours after the start | |
| Example 3 (w/w) | R-14 (68 nm) | 5.0 | 1.0 | 1.2 | 95 | 680 or more | 0.16 | 0.18 | $1.6 \times 10^7$ |
| Example 4 (w/w) | HS-100 (53 nm) | 0.5 | 1.0 | 1.2 | 99 | 800 or more | 0.17 | 0.18 | $7.0 \times 10^7$ |
| Example 5 (w/w) | BRACK EARKS 170 (50 nm) | 1.0 | 1.0 | 1.2 | 99 | 800 or more | 0.21 | 0.25 | $4.1 \times 10^7$ |
| Example 6 (w/w) | #228 (40 nm) | 2.0 | 1.0 | 1.2 | 98 | 800 or more | 0.22 | 0.25 | $4.6 \times 10^7$ |
| Example 7 (w/w) | R-420 (68 nm) | 5.0 | 1.0 | 1.2 | 95 | 700 | 0.23 | 0.27 | $3.8 \times 10^7$ |
| Example 8 (w/w) | R-MT-P (280 nm) | 0.5 | 1.0 | 1.2 | 95 | 620 | 0.16 | 0.20 | $9.1 \times 10^7$ |
| Example 9 (w/w) | HS-500 (76 nm) | 0.5 | 1.0 | 1.2 | 98 | 800 or more | 0.16 | 0.17 | $8.6 \times 10^7$ |
| Example 10 (w/w) | R-14 (68 nm) | 0.5 | 0.2 | 1.2 | 101 | 800 or more | 0.18 | 0.24 | $5.0 \times 10^7$ |
| Example 11 (w/w) | R-14 (68 nm) | 0.5 | 2.0 | 1.2 | 101 | 800 or more | 0.17 | 0.21 | $7.3 \times 10^7$ |
| Example 12 (w/w) | R-14 (68 nm) | 0.5 | 1.0 | 0.7 | 102 | 800 or more | 0.19 | 0.23 | $6.6 \times 10^7$ |
| Example 13 (w/w) | R-14 (68 nm) | 0.5 | 1.0 | 2.0 | 98 | 800 or more | 0.18 | 0.21 | $1.5 \times 10^7$ |
| Comparative Example 1 (w/d) | R-14 (68 nm) | 0.3 | 1.0 | 1.2 | 91 | 260 | 0.18 | 0.30 | $3.9 \times 10^7$ |
| Comparative Example 2, single layer | R-14 (68 nm) | 1.0 | — | 1.2 | 98 | 5 | 0.28 | 0.40 | $8.1 \times 10^{11}$ |
| Comparative Example 3, single layer | C-975 (24 nm) | 7.0 | — | 2.0 | 70 | 125 | 0.18 | 0.30 | $9.0 \times 10^9$ |
| Comparative Example 4 (w/w) | — | — | 1.0 | 1.2 | 100 | 300 | 0.29 | 0.45 | $7.0 \times 10^7$ |
| Comparative Example 5 (w/w) | R-14 (68 nm) | 5.5 | 1.0 | 1.2 | 85 | 380 | 0.18 | 0.23 | $1.2 \times 10^7$ |
| Comparative Example 6 (w/w) | R-14 (35 nm) | 0.5 | 1.0 | 1.2 | 100 | 90 | 0.25 | 0.40 | $5.1 \times 10^7$ |
| Comparative Example 7 (w/w) | R-14 (310 nm) | 0.5 | 1.0 | 1.2 | 92 | 241 | 0.15 | 0.19 | $5.6 \times 10^7$ |
| Example 1' (w/w) | R-14 (68 nm) | 0.3 | 1.0 | 1.2 | 100 | 800 or more | 0.18 | 0.22 | $2.5 \times 10^7$ |

\*: (w/w) = wet-on-wet
(w/d) = wet-on-dry

Examples 14 to 25, Comparative Examples 8 to 15

The following ingredients were kneaded sufficiently by means of a kneader or a ball mill to form a coating composition for a magnetic layer (coating composition IV) and a coating composition for a conductive layer (coating composition V). Immediately before application, a polyisocyanate compound (Coronate L manufactured by Nippon Polyurethane Industry Co., Ltd.) was added to each coating composition (5 parts to the coating composition IV and 20 parts to the coating composition V).

| Coating composition IV for magnetic layer | |
|---|---|
| Ba—Fe magnetic powder (Properties are described in Tables 2 and 3) | Amount shown in Table 2 |
| Organic dye compound (Kind and structure are shown in Tables 2 and 3 and FIGS. 1 to 5) | Amount shown in Table 2 |
| Polyurethane resin (Nippolan N-2304 manufactured by Nippon Polyurethane Co., Ltd.) | 5 parts |
| Vinyl chloride-vinyl acetate-vinyl alcohol copolymer (VAGH manufactured by U.C.C.) | 8 parts |
| α-alumina (AKP-30 manufactured by Sumitomo Chemical Co., Ltd.) | 10 parts |
| Oleyl oleate | 5 parts |
| Cyclohexanone | 200 parts |
| Toluene | 30 parts |
| Methyl ethyl ketone | 30 parts |
| Coating composition V for conductive layer | |
| Carbon black [Conductecs SC (C-SC) manufactured by Colombia Carbon Co., Ltd.] | 100 parts |
| Polyurethane resin (Nippolan N-2304 manufactured by Nippon Polyurethane Co., Ltd.) | 40 parts |
| Vinyl chloride-vinyl acetate-vinyl alcohol copolymer (VAGH manufactured by U.C.C.) | 60 parts |

| -continued | |
|---|---|
| Cyclohexane | 600 parts |
| Toluene | 200 parts |
| Methyl ethyl ketone | 200 parts |

On a 75 μm-thick polyethylene terephthalate base film (surface roughness Ra: 8 nm), the coating composition V and the coating composition IV were applied in this sequence by the wet-on-wet method by means of an extrusion coater, followed by drying and calendaring. The coating compositions were applied on the other side of the base film in the same manner as mentioned above, and subjected to drying and calendaring. Each of the resulting magnetic films was punched into a circular disc with a diameter of 86 mm and housed in a cartridge to obtain a 3.5-inch floppy disc. The properties of the floppy discs were examined by the following methods, and the results are shown in Tables 2 and 3.

(1) Output

Using the following drive, 2F signals (500 KHz) were recorded on this floppy disc. The signals were then reproduced and a reproduction output was measured. The reproduction output was indicated as a value relative to that of a floppy disc with a single magnetic layer which was prepared in comparative examples, which was taken as 100%. Larger reproduction outputs are favorable.

Number of tracks: 79
Drive: PD-211 manufactured by Toshiba Corp.

(2) Durability

Examined by the same method as mentioned in Example 1.

(3) Specific Surface Resistance

Examined by the same method as mentioned in Example 1.

(4) Surface Roughness Ra

Measured by using a three-dimensional surface roughness meter (3FK manufactured by Kosaka Laboratory Ltd.).

Cut-off: 0.25 mm dye compound. The properties of the disc were examined in substantially the same manner as in Comparative Example 8, and the results are shown in Table 4.

Comparative Example 18

A floppy disc was prepared in substantially the same manner as in Example 14, except that oleic acid was employed in place of the organic dye compound. The properties of the disc were examined in substantially the same manner as in Comparative Example 8, and the

TABLE 2

| | Example | | | | | | | | | | |
|---|---|---|---|---|---|---|---|---|---|---|---|
| | 14 | 14' | 15 | 16 | 17 | 18 | 19 | 20 | 21 | 22 | 23 |
| Magnetic powder | (1) | (1) | (1) | (1) | (2) | (2) | (2) | (2) | (3) | (3) | (3) |
| Hc (Oe) | 600 | 600 | 600 | 600 | 1300 | 1300 | 600 | 600 | 900 | 900 | 900 |
| BET (m$^2$/g) | 32 | 32 | 32 | 32 | 35 | 35 | 35 | 35 | 41 | 41 | 41 |
| Aspect ratio | 4 | 4 | 4 | 4 | 4 | 4 | 4 | 4 | 10 | 10 | 10 |
| Amount | 100 | 100 | 100 | 100 | 120 | 120 | 100 | 100 | 100 | 100 | 120 |
| Organic dye compound | (1) | (1) | (8) | (12) | (19) | (20) | (19) | (4) | (5) | (11) | (4) |
| Compound | 2 | 2 | 2 | 2 | 2 | 2 | 0.5 | 5 | 2 | 3 | 5 |
| Thickness (magnetic layer) | 1.2 | 1.2 | 1.2 | 1.2 | 1.2 | 1.2 | 1.2 | 1.2 | 0.7 | 0.7 | 0.7 |
| Thickness (conductive layer) | 0.7 | 0.7 | 0.7 | 0.7 | 0.7 | 0.7 | 0.7 | 0.7 | 0.7 | 0.3 | 2.2 |
| Surface roughness Ra (nm) | 8.5 | 8.0 | 9.0 | 8.0 | 7.5 | 7.5 | 9.5 | 9.5 | 8.0 | 8.0 | 7.5 |
| RF output (%) | 103 | 115 | 105 | 104 | 102 | 103 | 106 | 102 | 105 | 103 | 113 |
| Durability (0 to 60° C., 24 hr cycle) | 800 or more | 800 or more | 800 or more | 800 or more | 800 or more | 800 or more | 800 or more | 800 or more | 800 or more | 800 or more | 800 or more |
| Specific surface resistance | $7 \times 10^7$ | $4 \times 10^7$ | $6 \times 10^7$ | $5 \times 10^7$ | $5 \times 10^7$ | $8 \times 10^7$ | $5 \times 10^7$ | $7 \times 10^7$ | $8 \times 10^6$ | $8 \times 10^6$ | $9 \times 10^6$ |

TABLE 3

| | Example | | Comparative Example | | | | | | | |
|---|---|---|---|---|---|---|---|---|---|---|
| | 24 | 25 | 8 | 9 | 10 | 11 | 12 | 13 | 14 | 15 |
| Magnetic powder | (1) | (1) | (1) | (2) | (3) | (4) | (1) | (1) | (3) | (4) |
| Hc (Oe) | 1400 | 1400 | 600 | 1300 | 900 | 1400 | 600 | 600 | 900 | 1400 |
| BET (m$^2$/g) | 49 | 49 | 32 | 35 | 41 | 49 | 32 | 32 | 41 | 49 |
| Aspect ratio | 7 | 7 | 4 | 4 | 10 | 7 | 4 | 4 | 10 | 7 |
| Amount | 100 | 100 | 100 | 120 | 100 | 100 | 100 | 100 | 100 | 100 |
| Organic dye compound | (19) | (9) | None | None | None | None | (19) | (4) | (5) | (9) |
| Compound | 3 | 5 | — | — | — | — | 0.2 | 6 | 6 | 6 |
| Thickness (magnetic layer) | 0.7 | 1.8 | 1.2 | 1.2 | 0.7 | 0.7 | 1.2 | 1.2 | 0.7 | 0.7 |
| Thickness (conductive layer) | 0.7 | 0.7 | 0.7 | 0.7 | 0.7 | 0.7 | 0.7 | 0.7 | 0.7 | 0.7 |
| Surface roughness Ra (nm) | 6.0 | 5.0 | 28.5 | 28.5 | 25.0 | 23.0 | 20.0 | 14.0 | 14.5 | 16.5 |
| RF output (%) | 102 | 101 | 69 | 71 | 68 | 72 | 75 | 90 | 88 | 87 |
| Durability (0 to 60° C., 24 hr cycle) | 800 or more | 800 or more | 240 | 150 | 138 | 85 | 275 | 690 | 750 | 530 |
| Specific surface resistance | $5 \times 10^7$ | $1 \times 10^8$ | $8 \times 10^7$ | $7 \times 10^7$ | $1 \times 10^7$ | $2 \times 10^7$ | $9 \times 10^7$ | $1 \times 10^7$ | $6 \times 10^7$ | $5 \times 10^7$ |

Comparative Example 16

A floppy disc was prepared in substantially the same manner as in Example 14, except that lecithin was employed in place of the organic dye compound. The properties of the disc were examined in substantially the same manner as in Comparative example 8, and the results are shown in Table 4.

Comparative Example 17

A floppy disc was prepared in substantially the same manner as in Example 14, except that a phosphoric acid ester (RP-710) was employed in place of the organic results are shown in Table 4.

Comparative Example 19

A floppy disc was prepared in substantially the same manner as in Example 14, except that the coating was conducted by the wet-on-dry method. The properties of the disc were examined in substantially the same manner as in Comparative Example 8, and the results are shown in Table 4.

Comparative Example 20

A floppy disc was prepared in substantially the same manner as in Example 14, except that the formation of a conductive layer was omitted. The properties of the disc were examined in substantially the same manner as in Comparative Example 8, and the results are shown in Table 4.

Comparative Example 21

A floppy disc was prepared in substantially the same manner as in Comparative Example 16, except that the formation of a conductive layer was omitted. The properties of the disc were examined in substantially the same manner as in Comparative Example 8, and the results are shown in Table 4.

Comparative Example 22

A floppy disc was prepared in substantially the same manner as in Comparative Example 17, except that the formation of a conductive layer was omitted. The properties of the disc were examined in substantially the same manner as in Comparative Example 8, and the results are shown in Table 4.

Comparative Example 23

A floppy disc was prepared in substantially the same manner as in Comparative Example 18, except that the formation of a conductive layer was omitted. The properties of the disc were examined in substantially the same manner as in Comparative Example 8, and the results are shown in Table 4.

Comparative Example 24

A floppy disc was prepared in substantially the same manner as in Example 17, except that the formation of a conductive layer was omitted. The properties of the disc were examined in substantially the same manner as in Comparative Example 8, and the results are shown in Table 4.

Comparative Example 25

A floppy disc was prepared in substantially the same manner as in Example 21, except that the formation of a conductive layer was omitted. The properties of the disc were examined in substantially the same manner as in Comparative Example 8, and the results are shown in Table 4.

TABLE 4

| | Comparative Example | | | | | | | | | |
|---|---|---|---|---|---|---|---|---|---|---|
| | 17 | 18 | 19 | 20 | 21 | 22 | 23 | 24 | 25 | 26 |
| Magnetic powder | (1) | (1) | (1) | | | | | | | |
| Hc (Oe) | 600 | 600 | 600 | 600 | 600 | 600 | 600 | 1300 | 900 | 1400 |
| BET (m$^2$/g) | 32 | 32 | 32 | 32 | 32 | 32 | 32 | 32 | 41 | 49 |
| Aspect ratio | 4 | 4 | 4 | 4 | 4 | 4 | 4 | 4 | 10 | 7 |
| Amount | 100 | 100 | 100 | 100 | 100 | 100 | 100 | 120 | 100 | 100 |
| Organic dye compound | RP-710 | Oleic acid | Oleic acid | (1) | Lecithin | RP-710 | Oleic acid | (19) | (5) | (19) |
| Amount | 2 | 2 | 2 | 2 | 2 | 2 | 2 | 2 | 2 | 3 |
| Thickness (magnetic layer) | 1.2 | 1.2 | 1.2 | 1.2 | 1.2 | 1.2 | 1.2 | 1.2 | 0.7 | 0.7 |
| Thickness (conductive layer) | 0.7 | 0.7 | 0.7 | — | — | — | — | — | — | — |
| Surface roughness Ra (nm) | 16.5 | 15.0 | 15.0 | 9.5 | 12.5 | 12.0 | 11.5 | 8.0 | 9.0 | 8.0 |
| RF output (%) | 91 | 92 | 95 | 100 | 93 | 94 | 96 | 100 | 100 | 100 |
| Durability (0 to 60° C., 24 hr cycle) | 420 | 690 | 800 or more | 145 | 7 | 2 | 95 | 141 | 85 | 124 |
| Specific surface resistance | $2 \times 10^8$ | $1.5 \times 10^8$ | $9 \times 10^7$ | $9 \times 10^{11}$ | $7 \times 10^{11}$ | $7 \times 10^7$ | $8 \times 10^7$ | $9 \times 10^{11}$ | $9 \times 10^7$ | $8 \times 10^{11}$ | in Comparative Example 8, and the results are shown in Table 4.

Comparative Example 26

A floppy disc was prepared in substantially the same manner as in Example 24, except that the formation of a conductive layer was omitted. The properties of this disc were examined in substantially the same manner as in Comparative Example 8, and the results obtained are shown in Table 4.

Examples 26 to 35, Comparative Examples 27 to 32

The following ingredients were kneaded sufficiently by means of a kneader and a ball mill to form a coating composition for a magnetic layer (coating composition VI) and a coating composition for a conductive layer (coating composition V). Immediately before application, carbon black (Coronate L manufactured by Nippon Polyurethane Industry Co., Ltd.) was added to each composition (5 parts by weight to the composition VI and 20 parts by weight to the composition V).

Example 26'

Other were performed in the same manner except that MR110 (vinyl chloride containing SO3 produced by Nihon Zeon) in place of vinyl chloride-vinyl acetate-vinyl alcohol copolymer (VAGH) in Coating composition VI.

| Coating composition VI for magnetic layer | |
|---|---|
| Ba—Fe magnetic powder (Properties are shown in Tables 5 and 6) | 100 parts |
| Modified polyurethane resin containing a sulfonic group (UR-8300 manufactured by Toyobo Co., Ltd.) | 5 parts |
| Vinyl chloride-vinyl acetate-vinyl alcohol copolymer (VAGH manufactured by U.C.C.) | 8 parts |
| Non-magnetic metal oxide Type and amount are shown in Tables 5 and 6 | |
| Oleyl oleate | 5 parts |
| Cyclohexanone | 200 parts |
| Toluene | 30 parts |
| Methyl ethyl ketone | 30 parts |
| Coating composition V for conductive layer | |
| Carbon black [Conductex SC (C-SC) manufactured by Colombia Carbon Co., Ltd.] | 100 parts |
| Polyurethane resin (Nippolan N-2304 manufactured by Nippon Polyurethane Industry Co., Ltd.) | 40 parts |

-continued

| | |
|---|---|
| Vinyl chloride-vinyl acetate-vinyl alcohol copolymer (VAGH manufactured by U.C.C.) | 60 parts |
| Cyclohexane | 600 parts |
| Toluene | 200 parts |
| Methyl ethyl ketone | 200 parts |

On a 75 μm-thick polyethylene terephthalate base film (surface roughness $R_a$: 8 nm), the above coating compositions V and IV were applied in this sequence by the wet-on-wet method by means of an extrusion coater, followed by drying and calendaring. The above compositions were also applied on the other side of the base film by the same method as mentioned above, followed by drying and calendaring.

Each of the resulting magnetic films was punched into a circular disc with a diameter of 86 mm and housed in a cartridge to obtain a 3.5-inch floppy disc. The properties of the resulting discs were examined in substantially the same manner as in Example 1, and the results obtained are shown in Tables 5 and 6.

Comparative Example 27

Samples were prepared in the same manner as in Example 26 except that ZnO (Mohs hardness 4–4.5) was used in place of α-$Al_2O_3$ Examples 36 through 44

The following ingredients were kneaded sufficiently by means of a kneader of a ball mill to obtain a non-magnetic oxide dispersion. This dispersion was added to the coating composition VI such that the non-magnetic oxide amount became that shown in Table 5. Using this coating composition VI and the coating composition V, floppy discs were prepared in substantially the same manner as in Examples 26 to 35. The properties of these discs were examined in substantially the same manner as in Example 1, and the results obtained are shown in Table 6.

| Non-magnetic metal oxide dispersion | |
|---|---|
| Non-magnetic oxide (Types are shown in Table 6) | 100 parts |
| Modified polyurethane resin containing sodium sulfonate (UR-8300 manufactured by Toyobo Corp.) | 20 parts |
| Cyclohexanone | 30 parts |
| Methyl ethyl ketone | 15 parts |
| Toluene | 15 parts |

TABLE 5

| | Example | | | | | | | | | | |
|---|---|---|---|---|---|---|---|---|---|---|---|
| | 26 | 26' | 27 | 28 | 29 | 30 | 31 | 32 | 33 | 34 | 35 |
| Ba—Fe magnetic powder | (1) | (1) | (1) | (1) | (2) | (2) | (3) | (4) | (4) | (4) | (4) |
| Hc (Oe) | 600 | 600 | 600 | 600 | 1300 | 1300 | 900 | 1400 | 1400 | 1400 | 1400 |
| BET (m²/g) | 32 | 32 | 32 | 32 | 35 | 35 | 41 | 49 | 49 | 49 | 49 |
| Aspect ratio | 4 | 4 | 4 | 4 | 4 | 4 | 10 | 7 | 7 | 7 | 7 |
| Non-magnetic metal oxide | α-$Al_2O_3$ | α-$Al_2O_3$ | α-$Al_2O_3$ | α-$Al_2O_3$ | α-$Al_2O_3$ | α-$Al_2O_3$ | α-$Al_2O_3$ | α-$Al_2O_3$ | $Cr_2O_3$ | $Cr_2O_3$ | $Cr_2O_3$ |
| Average particle size (μm) | 0.4 | 0.4 | 0.4 | 0.4 | 0.7 | 0.4 | 0.3 | 0.3 | 0.3 | 0.3 | 0.6 |
| Amount (parts by weight) | 7 | 7 | 12 | 20 | 10 | 12 | 10 | 10 | 12 | 25 | 10 |
| Thickness (magnetic layer) | 1.2 | 1.2 | 1.2 | 1.2 | 1.2 | 0.7 | 1.2 | 2.2 | 1.5 | 1.5 | 1.5 |
| Thickness (conductive layer) | 0.7 | 0.7 | 0.7 | 0.7 | 0.7 | 0.2 | 2.0 | 0.7 | 0.5 | 0.5 | 0.5 |
| RF output (%) | 103 | 113 | 100 | 97 | 100 | 100 | 100 | 100 | 100 | 95 | 100 |
| Durability (0 to 60° C., 24 hr cycle) | 800 or more | 800 or more | 800 or more | 800 or more | 800 or more | 800 or more | 800 or more | 800 or more | 800 or more | 800 or more | 800 or more |
| Specific surface area | $3 \times 10^7$ | $3 \times 10^7$ | $2 \times 10^7$ | $3 \times 10^7$ | $3 \times 10^7$ | $5 \times 10^7$ | $1 \times 10^7$ | $2 \times 10^8$ | $6 \times 10^7$ | $7 \times 10^8$ | $9 \times 10^7$ |
| Dynamic coefficient of friction (immediately after the start) | 0.17 | 0.17 | 0.17 | 0.18 | 0.17 | 0.21 | 0.22 | 0.22 | 0.19 | 0.19 | 0.18 |
| Dynamic coefficient of friction (24 hours after the start) | 0.23 | 0.22 | 0.22 | 0.23 | 0.22 | 0.25 | 0.26 | 0.27 | 0.25 | 0.24 | 0.24 |

TABLE 6

| | Example | | | | | | | | | Comparative Example |
|---|---|---|---|---|---|---|---|---|---|---|
| | 36 | 37 | 38 | 39 | 40 | 41 | 42 | 43 | 44 | 27 |
| Ba—Fe magnetic powder | (1) | (4) | (1) | (1) | (1) | (1) | (4) | (4) | (4) | (1) |
| Hc (Oe) | 1400 | 1400 | 1400 | 1400 | 1400 | 1400 | 1400 | 1400 | 1400 | 1400 |
| BET (m²/g) | 49 | 49 | 49 | 49 | 49 | 49 | 49 | 49 | 49 | 49 |
| Aspect ratio | 7 | 7 | 7 | 7 | 7 | 7 | 7 | 7 | 7 | 7 |
| Non-magnetic metal oxide | α-$Al_2O_3$ | $Cr_2O_3$ | α-$Al_2O_3$ | α-$Al_2O_3$ | α-$Al_2O_3$ | α-$Al_2O_3$ | $Cr_2O_3$ | $Cr_2O_3$ | $Cr_2O_3$ | ZnO |
| Average particle size | 0.4 | 0.3 | 0.4 | 0.15 | 0.15 | 1.0 | 0.15 | 0.15 | 0.9 | 0.4 |

TABLE 6-continued

|  | Example | | | | | | | | | Comparative Example |
| --- | --- | --- | --- | --- | --- | --- | --- | --- | --- | --- |
|  | 36 | 37 | 38 | 39 | 40 | 41 | 42 | 43 | 44 | 27 |
| (μm) | | | | | | | | | | |
| Amount (parts by weight) | 12 | 12 | 12 | 12 | 20 | 12 | 12 | 25 | 10 | 12 |
| Thickness (magnetic layer) | 1.2 | 1.5 | 3.0 | 1.2 | 1.2 | 1.2 | 1.5 | 1.5 | 1.5 | 1.2 |
| Thickness (conductive layer) | 0.7 | 0.5 | 0.7 | 0.7 | 0.7 | 0.7 | 0.5 | 0.5 | 0.5 | 0.7 |
| RF output (%) | 105 | 106 | 100 | 102 | 100 | 90 | 103 | 98 | 89 | 102 |
| Durability (0 to 60° C., 24 hr cycle) | 800 or more | 800 or more | 720 | 56 | 48 | 430 | 88 | 50 | 350 | 50 |
| Specific surface area | $2 \times 10^7$ | $2 \times 10^8$ | $3 \times 10^9$ | $3 \times 10^7$ | $2 \times 10^7$ | $3 \times 10^7$ | $8 \times 10^7$ | $9 \times 10^7$ | $9 \times 10^7$ | $2 \times 10^7$ |
| Dynamic coefficient of friction (immediately after the start) | 0.16 | 0.18 | 0.18 | 0.25 | 0.22 | 0.18 | 0.22 | 0.20 | 0.19 | 0.18 |
| Dynamic coefficient of friction (24 hours after the start) | 0.17 | 0.19 | 0.22 | 0.33 | 0.32 | 0.24 | 0.35 | 0.29 | 0.25 | 0.20 |

What is claimed is:

1. A magnetic recording medium comprising a non-magnetic support having provided thereon, in sequence, a conductive layer containing carbon black, and a magnetic layer, said magnetic layer containing tabular barium ferrite magnetic particles, each of which has an axis of easy magnetization that is substantially perpendicular to its plane surface and, 7 to 30 parts by weight, per 100 parts of said magnetic particles, of α-alumina, there being in said magnetic particles, Fe elements, each of said magnetic particles having an average particle size of 400 to 900 521 , an aspect ration of 2.0 to 10.0, a coercive force of 450 to 1500 Oe, and at least some of said Fe elements are replaced by Co and/or Zn, said magnetic layer being formed on said conductive layer by a wet-on-wet process.

2. The magnetic recording medium of claim 1 wherein said α-alumina has an average particle size of 0.2 to 0.8 μm.

3. The magnetic recording medium of claim 1, wherein said carbon black contained in said conductive layer has a DBP absorption of 100 cc/100 g or more.

4. The magnetic recording medium of claim 1, wherein said carbon black contained in said conductive layer has an average particle size of 5 to 30 mμ.

5. The magnetic recording medium of claim 1, wherein said carbon black contained in said conductive layer has an average particle size of 10 to 25 mμ and a pH of less than 5.

* * * * *